United States Patent [19]
Doerge

[11] Patent Number: 5,849,807
[45] Date of Patent: Dec. 15, 1998

[54] HCFC-141B BLOWN FOAMS WITH LOW LEVELS OF HCFC-1131A BY-PRODUCTS

[75] Inventor: Herman P. Doerge, Pittsburgh, Pa.

[73] Assignee: Bayer Corporation, Pittsburgh, Pa.

[21] Appl. No.: 36,800

[22] Filed: Mar. 9, 1998

[51] Int. Cl.$^6$ .............................. C08G 18/00; C08J 9/14
[52] U.S. Cl. .......................................... 521/131; 521/159
[58] Field of Search ..................................... 521/131, 159

[56] References Cited

U.S. PATENT DOCUMENTS

| | | | |
|---|---|---|---|
| 5,137,929 | 8/1992 | Demmin et al. | 521/99 |
| 5,407,596 | 4/1995 | Mafoti et al. | 252/182.24 |

OTHER PUBLICATIONS

Hammel et al, "Decomposition of HCFC–123, HCFC–123a, and HCFC–141b in Polyuretheane Premix and in Foam" Feb. 3, 1992.

Bodnar et al, "Minimization of HCFC–141b Decomposition in Rigid Polyisocyanurate Foams", Oct. 21–24, 1992.

*Primary Examiner*—Morton Foelak
*Attorney, Agent, or Firm*—Joseph C. Gil; Lyndanne M. Whalen

[57] ABSTRACT

Rigid polyurethane foams having low thermal conductivity values are produced by reacting an organic polyisocyanate with an organic material having at least two isocyanate reactive hydrogen atoms and an OH value of from about 200 to about 650 in the presence of a blowing agent. The blowing agent is a mixture which includes dichlorofluoroethane (HCFC-141b) and greater than 1.0% by weight (based on total weight of the foam forming mixture) water. The foams obtained are characterized by a thermal conductivity of less than about 0.160 Btu-in./hr.ft$^2$° F., preferably less than about 0.150 Btu-in./hr.ft$^2$° F. These foams are particularly useful as insulation materials.

6 Claims, No Drawings

HCFC-141B BLOWN FOAMS WITH LOW LEVELS OF HCFC-1131A BY-PRODUCTS

BACKGROUND OF THE INVENTION

The present invention relates to a process for producing polyurethane foams produced using 1,1-dichloro-1-fluoroethane (HCFC-141b) as the primary blowing agent in which the level of 1-chloro-1-fluoroethylene (HCFC-1131a) by-product generated is substantially reduced and to the foams produced by this process.

Rigid polyurethane foams and processes for their production are well known in the art. Such foams are typically produced by reacting a polyisocyanate with an isocyanate-reactive material such as a polyol in the presence of a chlorofluorocarbon blowing agent. It is also known, however, that these chlorofluorocarbon blowing agents pose environmental problems.

Alternatives to the known chlorofluorocarbon blowing agents are currently the subject of much research. Hydrogen chlorofluorocarbons (HCFCs) are among the most promising alternatives. However, one of the problems encountered with HCFCs is that they tend to degrade under foam-forming conditions to a greater extent than their chlorofluorocarbon predecessors. The hydrohalocarbons undergo dehydrohalogenation to form halogenated alkenes. They may also undergo reduction reactions in which halogen atoms are replaced with hydrogen.

One solution to the HCFC degradation problem which was suggested by Hammel et al in their paper entitled, "Decomposition of HCFC-123, HCFC-123a, and HCFC-141b in Polyurethane Premix and in Foam", was to wait to add the HCFC to the foam-forming mixture until just before use. This solution is not, however, practical in commercial foam production processes.

Means for stabilizing hydrohalocarbons under foam-forming conditions have therefore been sought by those in the art. U.S. Pat. No. 5,137,929, for example, teaches that inclusion of certain types of stabilizers in a foam forming mixture reduces the amount of decomposition of hydrohalocarbon blowing agent during the foaming process. Among the materials taught to be useful as stabilizers are esters, organic acids, anhydrides, aminoacids, ammonium salts, bromoalkanes, bromoalcohols, bromoaromatic esters, chloroalcohols, nitroalkanes, nitroalcohols, triarylmethyl chlorides, triarylmethyl bromides, 3-sulfolene, zinc dialkyldithiophosphate, haloalkyl phosphate esters, carbon molecular sieves, powdered activated carbon, zeolite molecular sieves, sulfonate esters, and haloalkyl phosphate esters.

In their paper entitled, "Minimization of HCFC-141b Decomposition in Rigid Polyisocyanurate Foams", Bodnar et al take a different approach. Bodnar et al recommend that the catalyst employed in the foam forming reaction be selected so that any compatibilizer present in the polyol will not be able to solvate the cation of the catalyst and thereby render the anion of the catalyst more reactive.

U.S. Pat. No. 5,407,596 teaches that use of sucrose-based polyols in which some of the hydroxyl groups were blocked in the foam forming mixture reduces or eliminates the degradation of hydrohalocarbon blowing agents.

The use of specially modified polyols, special catalysts and/or stabilizers necessarily results in increased cost. It would therefore be advantageous to develop a method for producing foams from HCFC-141b in which degradation of the blowing agent is diminished without using specially modified or adapted materials.

SUMMARY OF THE INVENTION

It is an object of the present invention to provide a process for the production of polyurethane foams in which 1,1-dichloro-1-fluoroethane (HCFC-141b) is used as the primary blowing agent.

It is also an object of the present invention to provide a process for the production of polyurethane foams with HCFC-141b in which dehydrohalogenation of the blowing agent is substantially reduced.

It is another object of the present invention to provide polyurethane foams characterized by outstanding properties in which the amount of dehydrohalogenation by-product present in the cell walls is substantially reduced.

These and other objects which will be apparent to those skilled in the art are accomplished by reacting an organic polyisocyanate with an organic material having at least two isocyanate reactive hydrogen atoms in the presence of a blowing agent which is composed of water and dichlorofluoroethane (HCFC-141b), The water must be present in an amount greater than 1.0% by weight of the total foam forming mixture. The resultant foams are characterized by a thermal conductivity of less than about 0.160, preferably less than about 0.150, Btu-in./hr.ft$^{2\circ}$ F.

DETAILED DESCRIPTION OF THE PREFERRED EMBODIMENTS OF THE PRESENT INVENTION

The present invention is directed to a process for the production of polyurethane foams with dichlorofluoroethane as the primary blowing agent and to the foams produced with these polyols. In the process of the present invention, an organic polyisocyanate is reacted with an organic material having at least two isocyanate-reactive hydrogen atoms in the presence of a blowing agent which included 1,1-dichloro-1-fluoroethane and greater than 1% by weight (based on the total weight of the foam-forming mixture) of water.

HCFC-141b is commercially available and may generally be included in the reaction mixture in an amount of from about 2 to about 10% by weight, preferably from about 3 to about 9% by weight, and most preferably about 4 to about 7% by weight, based upon the total weight of the foam forming mixture.

The water included in the foam forming mixture is generally included in an amount of greater than 1.0% by weight, preferably from 1.0 to about 4.0% by weight, and most preferably about 1.5% by weight, based upon the total weight of the foam forming mixture.

The HCFC-141b and water may be added individually to the foam forming reaction mixture but it is preferred that the HCFC-141b and water be combined to form a mixture prior to addition to the foam forming mixture.

It is, of course, possible to use other known blowing agents in addition to the required HCFC-141b and water. Examples of such optional blowing agents include other known HCFC's such as monochlorodifluoromethane (HCFC-22); 2-monochloro-2,2-difluoroethane (HCFC-142b); and 1,1,1-trifluoro-2-chloro-2-fluoroethane (HCFC-124).

If used, the optional blowing agent is generally included in the blowing agent mixture in an amount which is no greater than 70% by weight of the total weight of the blowing agent mixture, preferably in an amount of 50% by weight or less, and most preferably in an amount of 30% by weight or less.

Any of the known organic isocyanates may be used in the process of the present invention. Isocyanates which may be used include aromatic, aliphatic, and cycloaliphatic polyisocyanates and combinations thereof. Examples of suitable isocyanates are: diisocyanates such as m-phenylene diisocyanate, p-phenylene diisocyanate, 2,4-toluene diisocyanate, 2,6-toluene diisocyanate, 1,6-hexamethylene diisocyanate, 1,4-hexamethylene diisocyanate, 1,4-cyclohexane diisocyanate, hexahydrotoluene diisocyanate and its isomers, 1,5-naphthylene diisocyanate, 1-methylphenyl-2,4-phenyl diisocyanate, 4,4'-diphenylmethane diisocyanate, 2,4'-diphenylmethane diisocyanate, 4,4'-biphenylene diisocyanate, 3,3'-dimethoxy-4,4'-biphenylene diisocyanate and 3,3'-dimethyl-diphenylpropane-4,4'-diisocyanate; triisocyanates such as 2,4,6-toluene triisocyanate; and polyisocyanates such as 4,4'-dimethyl-diphenylmethane-2,2',5,5'-tetraisocyanate and the polymethylene polyphenylpolyisocyanates.

A crude polyisocyanate may also be used in making polyurethanes by the process of the present invention. The crude toluene diisocyanate obtained by phosgenating a mixture of toluene diamines and the crude diphenylmethane diisocyanate obtained by phosgenating crude diphenyl-methanediamine are examples of suitable crude polyisocyanates. Suitable undistilled or crude polyisocyanates are disclosed in U.S. Pat. No. 3,215,652.

Suitable polyisocyanates for the production of rigid polyurethanes will generally have an isocyanate (i.e., NCO) content of from about 25 toabout 35%. Preferred polyisocyanates are methylene-bridged polyphenyl polyisocyanates and prepolymers of methylene-bridged polyphenyl polyisocyanates having an average functionality of from about 1.8 to about 3.5, preferably from about 2.0 to about 3.1 isocyanate moieties per molecule and an NCO content of from about 28 to about 34% by weight, due to their ability to cross-link the polyurethane.

The polyisocyanate is generally used in an amount such that the isocyanate index (i.e., the ratio of equivalents of isocyanate groups to equivalents of isocyanate-reactive groups) is from about 0.9 to about 1.5, preferably from about 1.0 to about 1.1.

Any of the known organic compounds but preferably polyols containing at least two isocyanate-reactive hydrogen atoms and having a hydroxyl (OH) value of from about 200 to about 650, preferably from about 350 to about 450, may be employed in the process of the present invention.

Suitable high functionality, high molecular weight polyols may be prepared by reacting a suitable initiator containing active hydrogens with alkylene oxide. Suitable initiators are those containing at least 4 active hydrogens or combinations of initiators where the mole average of active hydrogens is at least 4, preferably from about 4 to about 8, and more preferably from about 6 to about 8. Active hydrogens are defined as those hydrogens which are observed In the well-known Zerewitinoff test, see Kohler, Journal of the American Chemical Society, p. 3181, Vol. 49 (1927). Representative of such active hydrogen-containing groups include —OH, —COOH, —SH and —NHR where R is H or alkyl, aryl aromatic group and the like.

Examples of suitable initiators include pentaerythritol, carbohydrate compounds such as lactose, α-methylglucoside, α-hydroxyethylglucoside, hexitol, heptitol, sorbitol, dextrose, manitol, sucrose and the like. Examples of suitable aromatic initiators containing at least four active hydrogens include aromatic amines such as toluene diamine, particularly meta-toluene diamine and methane diphenylamine, the reaction product of a phenol with formaldehyde, and the reaction product of a phenol with formaldehyde and a dialkanolamine such as described by U.S. Pat. Nos. 3,297,597; 4,137,265 and 4,383,102 (incorporated herein by reference). Other suitable initiators which may be used in combination with the initiators containing at least four active hydrogens include water, glycerine, trimethylolpropane, hexane triol, aminoethylpiperazine and the like. These initiators may contain less than four active hydrogens and therefore can only be employed in quantities such that the total mole average of active hydrogens per molecule remains at least about 3.5 or more. Particularly preferred initiators for the preparation of the high functionality, high molecular weight polyols comprise sucrose, dextrose, sorbitol, α-methylglucoside, α-hydroxyethylglucoside which may be employed separately or in combination with other initiators such as glycerine or water.

The polyols may be prepared by methods well-known in the art such as taught by Wurtz, The Encyclopedia of Chemical Technology, Vol. 7, p. 257–266, lnterscience Publishers Inc. (1951) and U.S. Pat. No. 1,922,459. For example, polyols can be prepared by reacting, in the presence of an oxyalkylation catalyst, the initiator with an alkylene oxide. A wide variety of oxyalkylation catalysts may be employed, if desired, to promote the reaction between the initiator and the alkylene oxide. Suitable catalysts include those described in U.S. Pat. Nos. 3,393,243 and 4,595,743, incorporated herein by reference. However, it is preferred to use as a catalyst a basic compound such as an alkali metal hydroxide, e.g., sodium or potassium hydroxide, or a tertiary amine such as trimethylamine.

Polyether polyols are among the preferred polyols. Polyether polyols prepared by reacting sucrose with an alkylene oxide such as ethylene oxide and/or propylene oxide in the presence of an alkaline catalyst are most preferred. U.S. Pat. No. 4,430,490 discloses a suitable process for producing such polyether polyols.

It is preferred that the sucrose first be reacted with ethylene oxide and then propylene oxide. The ethylene oxide is generally used in an amount of from about 10 to about 50%, preferably from about 20 to about 40% by weight of the total alkylene oxide used. The propylene oxide is generally used in an amount of from about 50 to about 90% by weight of the total alkylene oxide employed, preferably from about 60 to about 80% by weight. The resultant polyol will have a molecular weight (determined by end group analysis) of from about 400 to about 1200, preferably from about 550 to about 750.

The acid used to neutralize the alkaline catalyst present in the polyol may be any acid which reacts with the alkaline catalyst to produce a material which is soluble in the polyether. Examples of suitable acids include: sulfuric acid, lactic acid, salicylic acid, substituted salicylic acid such as 2-hydroxy 3-methyl benzoic acid, 2-hydroxy 4-methyl benzoic acid and mixtures of such acids.

The sucrose-based polyether polyol is generally included in foam forming mixtures in an amount of from about 5 to about 35% by weight, based on the total foam-forming mixture, preferably from about 20 to about 30% by weight.

The reaction is usually carried out at a temperature of about 60° C. to about 160° C., and is allowed to proceed using such a proportion of alkylene oxide to initiator so as to obtain a polyol having a hydroxyl number ranging from about 200 to about 650, preferably about 300 to about 550, most preferably from about 350 to about 500. The hydroxyl number range of from about 200 to about 650 corresponds to an equivalent weight range of about 86 to about 280.

Polyols of higher hydroxyl number than 650 may be used as optional ingredients in the process of the present invention. Amine-based polyols having OH values greater than 650, preferably greater than 700 are particularly useful as optional ingredients.

The alkylene oxides which may be used in the preparation of the polyol include any compound having a cyclic ether group, preferably an α,β-oxirane, and are unsubstituted or alternatively substituted with inert groups which do not chemically react under the conditions encountered whilst preparing a polyol. Examples of suitable alkylene oxides include ethylene oxide, propylene oxide, 1,2- or 2,3-butylene oxide, the various isomers of hexane oxide, styrene oxide, epichlorohydrin, epoxychlorohexane, epoxychloropentane and the like. Most preferred, on the basis of performance, availability and cost are ethylene oxide, propylene oxide, butylene oxide and mixtures thereof, with ethylene oxide, propylene oxide, or mixtures thereof being most preferred. When polyols are prepared with combinations of alkylene oxides, the alkylene oxides may be reacted as a complete mixture providing a random distribution of oxyalkylene units within the oxide chain of the polyol or alternatively they may be reacted in a step-wise manner so as to provide a block distribution within the oxyalkylene chain of the polyol.

Such polyols include a sucrose-initiated polyol propoxylated to an average hydroxyl number of from about 400 to about 500, a sorbitol-initiated polyol propoxylated to an average hydroxyl number of about 250 to about 290, a sorbitol-glycerine initiated polyol having nominally an average of about 4.0 to about 4.4 active hydrogens and propoxylated to a hydroxyl number of about 250 to about 290.

The polyol is used in a quantity sufficient to allow the preparation of low friability, good dimensionally stable and strong foams having a thermal conductivity of less than about 0.160 Btu-in./hr.ft.$^{2\circ}$ F.

Suitable optional polyols include polyether polyols, polyester polyols, polyhydroxy-terminated acetal resins, hydroxy-terminated amines and polyamines. Examples of these and other suitable materials are described more fully in U.S. Pat. No. 4,394,491, particularly in columns 3 to 5 thereof. Most preferred for preparing rigid foams are those having from about 2 to about 8, preferably from about 3 to about 8 active hydrogens and having a hydroxyl number from about 50 to about 800, preferably from about 200 to about 650, and more preferably from about 300 to about 550. Examples of such polyols include those commercially available under the product names Terate (available from Cape Industries) and Multranol (available from Bayer Corporation).

Other components useful in producing the polyurethanes of the present invention include surfactants, pigments, colorants, fillers, antioxidants, flame retardants, stabilizers, etc.

When preparing polyisocyanate-based foams, it is generally advantageous to employ a minor amount of a surfactant to stabilize the foaming reaction mixture until it obtains rigidity. Such surfactants advantageously comprise a liquid or solid organosilicon compound. Other, less preferred surfactants include polyethylene glycol ethers of long chain alcohols, tertiary amine or alkanolamine salts of long chain alkyl acid sulfate esters, alkylsulfonic esters, alkylarylsulfonic acids. Such surfactants are employed in amounts sufficient to stabilize the foaming reaction mixture against collapse and the formation of large, and uneven cells. Typically, about 0.2 to about 5.0 parts of the surfactant per 100 parts per weight polyol composition are sufficient for this purpose.

One or more catalysts for the reaction of the polyol and water with the polyisocyanate are advantageously used. Any suitable urethane catalyst may be used including the known tertiary amine compounds and organometallic compounds.

Examples of suitable tertiary amine catalysts include triethylenediamine, N-methylmorpholine, pentamethyldiethylenetriamine, dimethylcyclohexylamine, tetramethyl ethylenediamine, 1-methyl-4-dimethylaminoethyl-piperazine, 3-methoxy-N-dimethyl-propyl amine, N-ethylmorpholine, diethylethanolamine, N-cocomorpholine, N,N-dimethyl-N',N'-dimethyl isopropyl-propylene diamine, N,N-diethyl -3-diethyl aminopropyl amine and dimethyl-benzyl amine. Examples of suitable organometallic catalysts include organomercury, organolead, organoferric and organotin catalysts, with organotin catalysts being preferred. Suitable organotin catalysts include tin salts of carboxylic acids such as dibutyl tin di-2-ethyl hexanoate and dibutyltin dilaurate. Metal salts such as stannous chloride can also function as catalysts for the urethane reaction. A catalyst for the trimerization of polyisocyanates, such as an alkali metal alkoxide or carboxylate, may also optionally be employed herein. Such catalysts are used in an amount which measurably increases the rate of reaction of the polyisocyanate. Typical amounts are about 0.01 to about 1 part of catalyst per 100 parts by weight of polyol.

The components described may be employed to produce rigid polyurethane and polyurethane-modified isocyanurate foam. The isocyanate-reactive compound having an OH value of from about 200 to about 650 and any other optional polyol are reacted with an organic polyisocyanate in the presence of blowing agent, catalyst, surfactant, additives, fillers, etc. The rigid foams of the present invention may be made in a one-step process by reacting all of the ingredients together at once, or foams can be made by the so-called quasi prepolymer method. In the one-shot process where foaming is carried out in machines, the active hydrogen-containing compounds, catalyst, surfactants, blowing agents and optional additives may be introduced separately to the mixing head where they are combined with the polyisocyanate to give the polyurethane-forming mixture. The mixture may be poured or injected into a suitable container or molded as required. For use of machines with a limited number of component lines into the mixing head, a premix of all the components except the polyisocyanate can be advantageously employed. This simplifies the metering and mixing of the reacting components at the time the polyurethane-forming mixture is prepared.

Alternatively, the foams may be prepared by the so-called "quasi prepolymer" method. In this method a portion of the polyol component is reacted in the absence of catalysts with the polyisocyanate component in proportion so as to provide from about 10 percent to about 30 percent of free isocyanate groups in the reaction product based on the prepolymer. To prepare foam, the remaining portion of the polyol is added and the components are allowed to react together in the presence of catalysts and other appropriate additives such as blowing agent, surfactant, etc. Other additives may be added to either the prepolymer or remaining polyol or both prior to the mixing of the components, whereby at the end of the reaction a rigid polyurethane foam is provided.

Foams produced in accordance with the present invention are characterized by reduced levels of the decomposition product HCFC-1131a.

The polyurethane foams of this invention have a thermal conductivity of less than about 0.160, preferably less than about 0.150 Btu-in./hr.ft$^2$° F., are useful in a wide range of applications. Accordingly, not only can rigid appliance foam be prepared but spray insulation rigid insulating board stock, laminates and many other types of rigid foam can easily be prepared with the process of this invention.

Having thus described my invention, the following Examples are given as being illustrative thereof. All parts and percentages given in these Examples are parts by weight and percentages by weight, unless otherwise indicated.

EXAMPLES

The materials used in the Examples given below were as follows:

POLYOL A: a polyether polyol prepared by reacting sucrose, propylene glycol and water first with ethylene oxide(30% of total alkylene oxide) and then with propylene oxide (70% of total alkylene oxide) in the presence of a base and subsequently neutralizing the reaction mixture with lactic acid. The salt formed was allowed to remain in the polyol. This polyol had an OH number of 467.2.

POLYOL B: a polyether polyol prepared by reacting o-toluene diamine with ethylene oxide and propylene oxide in the presence of a base and subsequently neutralizing the reaction mixture with lactic acid. The salt formed was allowed to remain in the polyol. This polyol had an OH number of 395.

POLYOL C: a polyester polyol which is commercially available under the name Stepanpol PS-2502A from Stepan Company. This polyol had an OH number of 240.

POLYOL D: a sucrose-initiated polyether polyol prepared by reacting sucrose, water and propylene glycol with propylene oxide. The OH number of this polyol was 340.

SURFACTANT A: a polyalkylene oxide dimethyl siloxane copolymer which is commercially available under the designation DC-5357 from Air Products and Chemicals, Inc.

SURFACTANT B: a polyalkylene oxide dimethyl siloxane copolymer which is commercially available under the designation L-1512 from Air Products and Chemicals, Inc.

CATALYST A: a strongly basic, amber brown liquid having a characteristic amine odor which is commercially available from Air Products and Chemicals, Inc. under the name Polycat 41.

CATALYST B: a tertiary amine catalyst which is commercially available from Air Products and Chemicals, Inc. under the name Polycat 8.

CATALYST C: a tertiary amine catalyst which is commercially available from Rhein Chemie under the name Desmorapid PV.

HCFC-141b: 1,1-dichloro-1-fluoroethane.

HCFC-1131 a: 1-chloro-1-fluoroethylene.

ISO: a modified polymethylene polyphenyl polyisocyanate prepolymer which is commercially available from Bayer Corporation under the name Mondur 1451 having an NCO group content of approximately 29.5%.

Polyols A, B, C and D, surfactant, catalyst, blowing agent and ISO were combined and reacted in the amounts indicated in the Table below. The properties of the product foams are also reported in the Table.

TABLE

| EXAMPLE | 1* | 2 |
|---|---|---|
| POLYOL A (pbw) | 41.79 | 40.38 |
| POLYOL B (pbw) | 20.90 | 16.07 |
| POLYOL C (pbw) | 6.97 | 8.03 |
| POLYOL D (pbw) | — | 15.02 |
| SURFACTANT A (pbw) | 2.40 | — |
| SURFACTANT B (pbw) | — | 2.44 |
| CATALYST A (pbw) | 0.45 | — |
| CATALYST B (pbw) | — | 0.86 |
| CATALYST C (pbw) | 0.90 | 0.43 |
| WATER (pbw) | 1.50 | 3.52 |
| HCFC-141b (pbw) | 25.09 | 13.30 |
| ISO (pbw) | 123.40 | 144.50 |
| K-factor (Btu-in./hr.ft.$^2$ °F.) | | |
| at 35° F. | 0.120 | 0.130 |
| at 75° F. | 0.126 | 0.145 |
| Overall Density (lbs./ft.$^3$) | 2.07 | 2.18 |
| μg HCFC-1131a/gm of HCFC-141b | 1210 ± 40 | 650 ± 50 |

*Comparative Example

The foam formulation of Example 1 had a water content of 0.67% by weight, based on the total weight of the foam formulation. The level of HCFC-1131a by-product generated during foaming of this formulation was 1210 micrograms for each gram of HCFC-141b.

The foam formulation of Example 2 had a water content of 1.44% (based on the total weight of the foam formulation). The level of HCFC-1131a by-product generated during foaming of this formulation was only 650 micrograms for each gram of HCFC-141b.

It is readily apparent from the data present in the Table that foams made with the higher amount of water contained less of the unwanted by-product HCFC-1131a per gram of HCFC-141b used. This lower relative amount of HCFC-1131a had not been expected.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a rigid polyurethane foam having a thermal conductivity of less than about 0.160 Btu-in/hr.ft$^2$° F. comprising reacting
    a) an organic polyisocyanate with
    b) an organic material having at least two isocyanate-reactive hydrogen atoms and an OH value of from about 200 to about 650
in the presence of
    c) greater than 1.0% by weight water and
    d) 1,1-dichloro-1-fluoroethane.

2. The process of claim 1 in which the polyisocyanate has an NCO content of from about 25 to about 35%.

3. The process of claim 1 in which the organic material having at least two isocyanate reactive hydrogen atoms is a mixture of polyether polyol and ester group-containing polyol.

4. The process of claim 1 in which the polyisocyanate is a methylene bridged polyphenyl polyisocyanate or a prepolymer thereof having an isocyanate group content of from about 28 to about 34%.

5. The process of claim 1 in which from about 1.0 to about 4.0% by weight water is present during the reaction.

6. The process of claim 1 in which an HCFC blowing agent which is different from 1,1-dichloro-1-fluoroethane is also present during the reaction.

* * * * *